Dec. 26, 1944.  C. R. BUSCH  2,365,744
BRAKE RIGGING AND/OR RAILWAY CAR TRUCK
Filed May 15, 1941  2 Sheets-Sheet 2
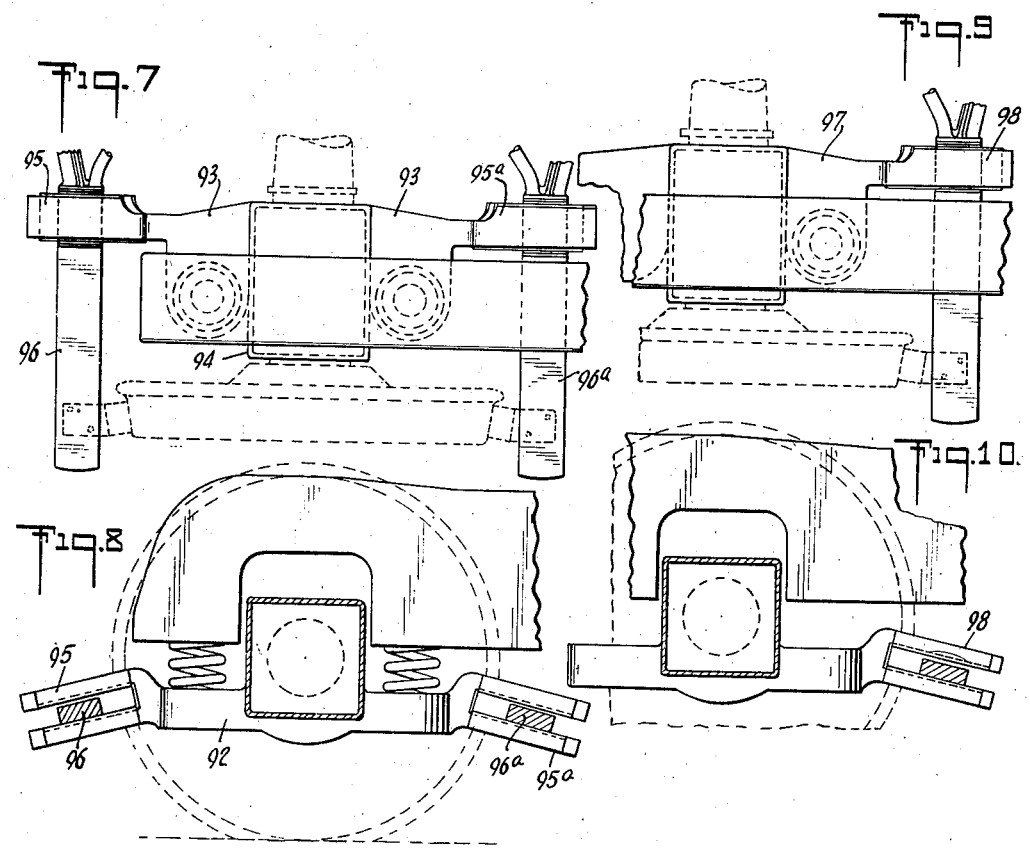
INVENTOR
CHARLES R. BUSCH
BY
ATTORNEY Patented Dec. 26, 1944

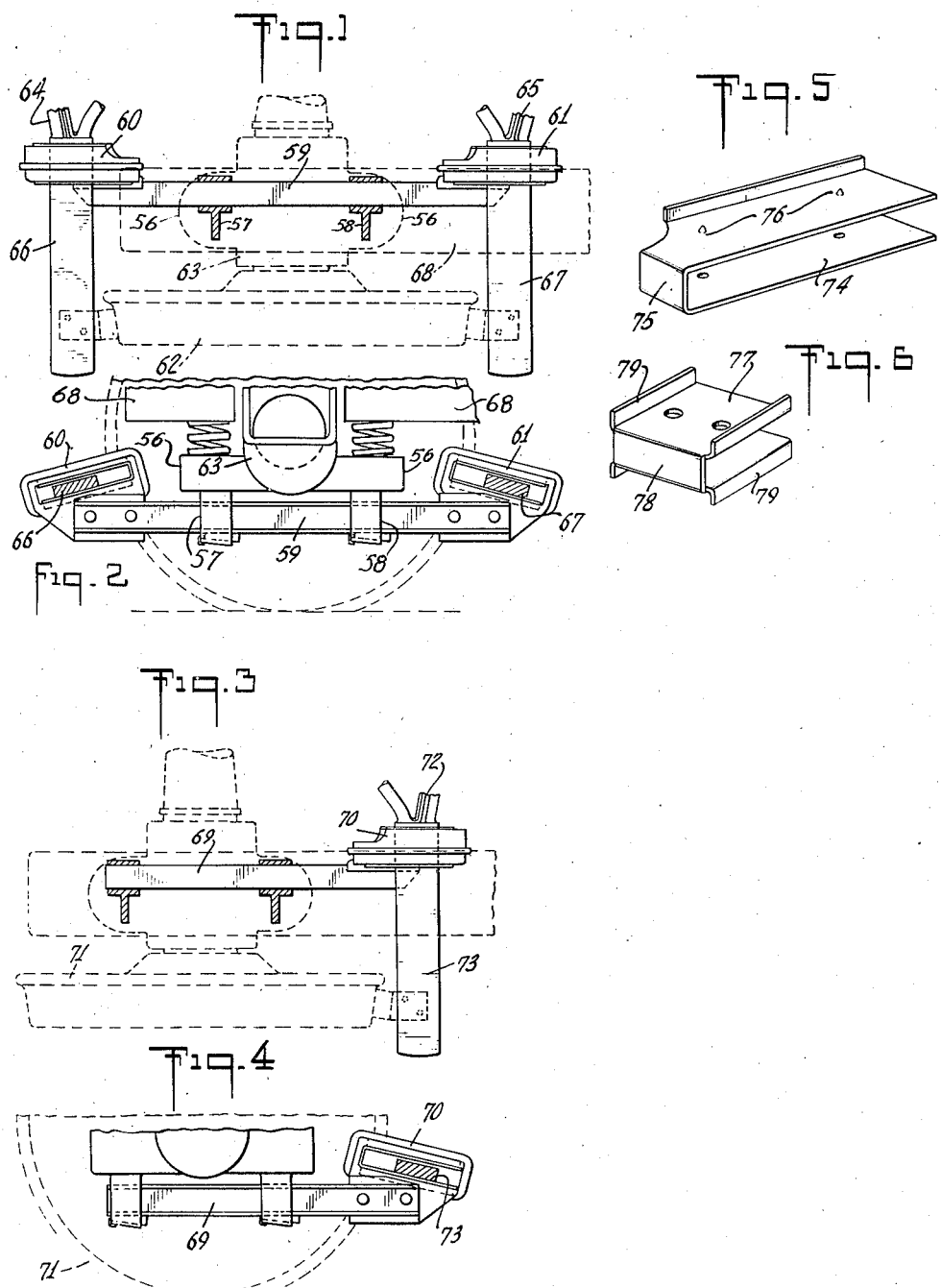

2,365,744

UNITED STATES PATENT OFFICE 2,365,744

BRAKE RIGGING AND/OR RAILWAY CAR TRUCK

Charles R. Busch, Orange, N. J., assignor to Buffalo Brake Beam Company, New York, N. Y., a corporation of New York Application May 15, 1941, Serial No. 393,584

2 Claims. (Cl. 188—212)

This invention relates to brake rigging and/or railway car trucks, more especially, but not necessarily, adapted for high-speed service, and to a type of truck such as disclosed in my copending applications Serial Nos. 393,581 and 393,583, identified as Cases A and C, which have respectively matured into Patents No. 2,340,927, dated February 8, 1944, and No. 2,310,195, dated February 2, 1943, the present invention differing therefrom more or less.

An object of the present invention is to statically support a guide, along which a brake beam may operate, by mounting it rigidly on a journal box of a car truck, whereof the side frame, the axle and box are located inwardly of the adjacent wheel, the support being removable with the guide from below the box, where the support is easily accessible, or the support and guide may be integral with the bottom of the box.

Other objects are to provide a simple yet very strong support for the guide and the brake beam guided thereby, so constructed and mounted on the journal box as to substantially reduce the weight of the parts, and which preferably is a channel-bar, which can be quickly applied to a journal box when the truck is at most any point along a railroad.

These being among the objects of the present invention, the same consists of certain features of construction and combinations of parts to be hereinafter described and then claimed with reference to the accompanying drawings illustrating a number of forms of the invention, and wherein—

Fig. 1 is a view showing two guides and support therefor located inboard of the adjacent wheel;

Fig. 2 is a side elevation of the parts shown in Fig. 1, partly in section;

Fig. 3 is a plan, partly in broken lines, similar to Fig. 1, and showing a modification in which there is but one brake beam;

Fig. 4 is a sectional side elevation of Fig. 3;

Fig. 5 is a perspective view of a wear lining;

Fig. 6 is a perspective view of a wear-shoe for a brake beam;

Fig. 7 is a plan showing a modification of Figs. 1 to 4, where the guide support and guides are located inboard of the wheel;

Fig. 8 is a side elevation of Fig. 7;

Fig. 9 is a plan similar to Fig. 7, except that one beam guide only is shown; and Fig. 10 is a side elevation of Fig. 9.

Referring to the various drawings, it will be understood that the invention is shown only in connection with one journal box and one wheel-and-axle assembly, and that the features of the invention as hereinafter described apply to as many wheel-and-axle assemblies as there are in the car truck, whether the truck have two, four, six or eight wheels.

Figs. 1 and 2 illustrate a portion of a car truck whereof the opposite wheels are outward of the principal parts involved in the present invention; that is to say such parts are located inward or inboard of such wheels, of which wheel 62 is shown in broken lines.

The journal box 63 has depending from rigid side extensions 56 thereof a pair of supporting lugs 57, 58, which are open to receive a channel bar 59, preferably, which may be rigidly fixed in horizontal position in any suitable manner as by wedges, after it has been inserted through the supports 57, 58.

Bar 59 is long enough to project beyond and away from opposite sides of the journal box 63. Upon the opposite ends of the said bar there are rigidly fixed two slotted guide brackets 60, 61, for mounting clasp-brake beams 64, 65, thereon by positioning flat end extensions 66, 67 thereof in the guide slots of said brackets. If the guide brackets are riveted in position the rivets of either of them may be removed so that bar 59 may be pulled out from the supporting lugs.

Each of the slots of the guides 60, 61, preferably lies at an inclination outwardly and downwardly with respect to the axle, so that each slot extends in a plane substantially intersecting the axle. The end extensions of the beams are long enough to pass beyond the journal box 63 to such points that brake heads and shoes mounted thereon will be adjacent the tread of the car wheel 62 and in the vertical plane of the wheel. Each side frame 68, one of which is indicated by broken lines, is located inboard of the wheel, and hence the end extensions of the beams project outwardly beyond the vertical planes of the side frames.

In Figs. 3 and 4 a slight modification of the construction shown in Figs. 1 and 2 is illustrated, residing in a single service bar 69, having at that end which projects beyond the journal box a rigidly-supported guide-bracket 70, to one side of the tread of the wheel 71. A single brake beam 72 is shown as provided with a flat extended end 73 having the additional length required for such types of brake beams as shown in Figs. 1 and 2. The brake beams shown in Figs. 1–4 may be inserted in the guides before their brackets are attached to the supporting bars. In Fig. 5 there is illustrated a wear lining 74, the opposite walls of which are connected at their ends by an end wall 75, and when inserted in the guide-slots for brake beams such as shown in Figs. 1–4 inclusive, must allow the beams to pass entirely through such slots, and therefore, the opposite walls of lining 74 are connected only at their ends. The lining 74 may be snapped into position and held by means of slight protuberances 76, which engage in corresponding depressions in the opposed guide walls, after the manner set forth in Patent No. 2,170,123.

In Fig. 6, a wear-resisting member 77 is illustrated which is adapted to cover that portion of the extended beam end 66 or the like, where it passes entirely through a guide-slot, and the said member and lining 74 form the subject matter of a copending application which has now matured into Patent No. 2,350,671. As disclosed in said application, the wear-resisting covering 77 is provided with an edge wall 78, which is adapted to engage with the edge of an extended end such as 66, and the said covering may be provided with outwardly-deflected guide-lips 79, which are adapted to slide along the edges of the walls of the guide slot. Said covering may be secured rigidly to the brake beam in any desired manner.

Figs. 7 and 8 also illustrate an inboard type of construction. In these figures there is a cross-member 92 having a supporting portion 93, which cross-member is secured to journal box 94, which is located inboard of the wheel, in which case the members 92, 93 will be inboard of the wheel. The supporting portion 93 is provided at opposite ends with two forked guides 95, 95a for receiving and guiding the ends 96, 96a of beams such as shown in Fig. 1.

Cross member 92 takes the place of guide supporting bar 59 under the journal box. Said member is preferably formed integral with the journal box, although obviously it may be made as a separate member either removably secured, or welded or otherwise permanently attached to the box, and obviously if made as an entirely separate member it can be attached to, or detached from, the journal box by bolting the same thereto.

The transverse member 92 is shown as thickening the bottom of the box, and the ends thereof project laterally beyond opposite sides of the box, to provide seats upon which the springs of the inboard side frame may be seated. Therefore, the transverse supporting member will have a static position with reference to the axis of the adjacent wheel, while the truck side frame will be supported for the extra degree of travel which seems to be desirable in high speed trucks.

Figs. 9 and 10, disclose a slight modification of the construction shown in Figs. 7 and 8, in that the beam-supporting portion 97 is provided with only one guide-fork 98.

It is to be understood that in all of the constructions illustrated and described the guide for the brake beams is in a fixed position relatively to the axis of the adjacent car wheel, and that it is inclined in relation to such axis preferably so as to be aligned with said axis, and that when two guides are used for a clasp brake, they extend in planes diverging from the wheel axis. In those embodiments of the invention, where two brake-beam guides are disclosed as supported from a journal-box, the drawings illustrate that the planes in which the guide extend intersect within said box.

In addition to the constructions herein shown and described, it will be obvious to those skilled in the art that the invention may be still further modified and yet be within the scope of the appended claims.

What I claim as new is:

1. A car truck, including a relatively movable side frame, journal box and wheel-and-axle assembly, the axle and box being inward of the wheel, and the side frame inward of the wheel and above the box, in combination with means on and rigid with the box and extending away from a lateral side of the box, the side frame supported by the rigid means, and a brake beam guide rigidly supported beyond such side by the extension of the rigid means, and located adjacent the inward side of the frame, such guide inclined outwardly and downwardly with respect to the axle, and extending in a plane substantially intersecting the axle.

2. A car truck in accordance with claim 1 and also including a brake beam guided inwardly of the wheel by the said guide and extended to a point adjacent to the tread of the wheel to carry a brake head.

CHARLES R. BUSCH.